United States Patent [19]

Hanai et al.

[11] 4,280,717
[45] Jul. 28, 1981

[54] SUSPENSION ARM MOUNTING

[75] Inventors: Kiyoshi Hanai; Takeo Kondo, both of Toyota, Japan

[73] Assignee: Toyota Jidosha Kogyo Kabushiki Kaisha, Aichi, Japan

[21] Appl. No.: 41,197

[22] Filed: May 21, 1979

[30] Foreign Application Priority Data

May 24, 1978 [JP] Japan .............................. 53-71030[U]

[51] Int. Cl.³ ................................................ B60G 7/02
[52] U.S. Cl. ..................................... 280/663; 280/666; 280/696
[58] Field of Search ............... 280/693, 696, 698, 701, 280/716, 666; 267/60, 63 R, 20 R

[56] References Cited

U.S. PATENT DOCUMENTS

| 3,075,786 | 1/1963 | Freers | 280/660 |
| 3,181,882 | 5/1965 | Rosky | 280/666 |
| 3,201,142 | 8/1965 | Danganthier | 280/696 |
| 3,831,967 | 8/1974 | Uhlenhant | 280/72 X |

Primary Examiner—Robert R. Song
Attorney, Agent, or Firm—Oblon, Fisher, Spivak, McClelland & Maier

[57] ABSTRACT

A trailing arm suspension for a vehicle includes a suspension arm connected at its inner and outer connecting portions to a suspension member. The outer connecting portion of the arm has a bush designed to cause a greater deflection than the bush provided in the inner connecting portion upon application of an equal radial load to both of the bushes.

6 Claims, 6 Drawing Figures

SUSPENSION ARM MOUNTING

BACKGROUND OF THE INVENTION

1. Field of the Invention

This invention relates to a trailing arm suspension for a vehicle, and more particularly, to the mounting of a suspension arm to a suspension member.

2. Description of the Prior Art

A trailing arm suspension generally includes a suspension arm having an inner and an outer connecting portion which connects the arm to a suspension member. The inner and outer connecting portions are each provided with a vibration damping bush. A greater part of the load applied longitudinally of the vehicle acts on the outer bush than on the inner bush, while a greater part of the load applied vertically on the vehicle acts on the inner bush. If the spring constant of each bush is reduced to increase the compliance of the suspension with the load acting longitudinally on the vehicle, the greater vertical load on the inner bush disadvantageously causes a greater change in the angle of camber of the wheels, or failure of the bush.

SUMMARY OF THE INVENTION

It is an object of this invention to provide in a trailing arm suspension for a vehicle a novel and an improved arrangement for mounting a suspension arm which ensures a higher compliance of the suspension with the load acting vertically on the vehicle to thereby make the vehicle more comfortable to ride in. It is another object of this invention to provide a novel and improved arrangement for mounting a suspension arm in a trailing arm suspension for a vehicle, which arrangement can minimize variation in the camber of wheels and prevent failure of bushes.

It is a further object of this invention to provide a novel and improved arrangement for mounting a suspension arm in a trailing arm suspension for a vehicle, which facilitates adjustment of the steering characteristics.

DESCRIPTION OF THE PREFERRED EMBODIMENT

Figure 1:
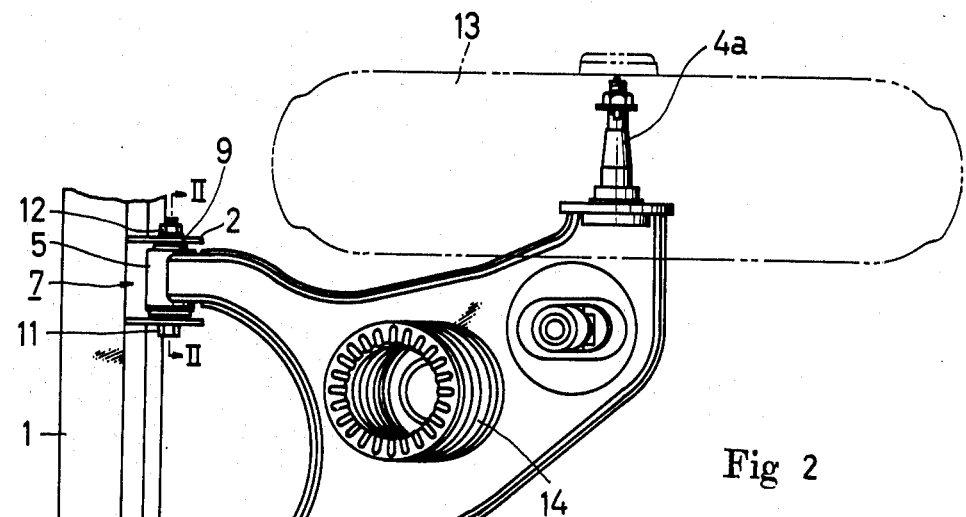
FIG. 1 is a top plan view of the trailing arm suspension in which this invention is embodied.
Figure 2:
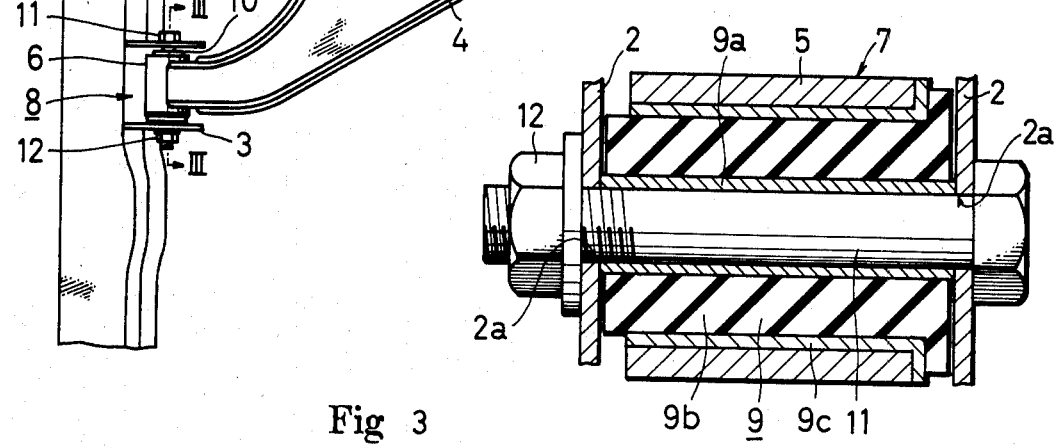
FIG. 2 is an enlarged sectional view taken on the line II—II of FIG. 1.

Referring first to FIG. 1 of the drawings, there is shown a trailing arm suspension having a suspension member 1 to which a suspension arm 4 is connected. As is well known, the suspension member 1 has a pair of brackets 2 and 3, and the suspension arm 4 is bifurcated to define an outer connecting portion 7 and an inner connecting portion 8. The outer connecting portion 7 includes a sleeve 5 received in the bracket 2, and a cylindrical bush 9 interposed between the bracket 2 and the sleeve 5. The inner connecting portion 8 is similarly constructed, and includes a sleeve 6 and a cylindrical bush 10 placed between the bracket 3 and the sleeve 6. With reference to FIG. 2, the bush 9 includes a metallic inner cylinder 9a, a metallic outer cylinder 9c, and a cylindrical vibration damping member 9b interposed between the inner and outer cylinders 9a and 9c and made of elastic material, such as rubber. The bracket 2 is pierced with a pair of holes 2a through which a bolt 11 extends. The bolt 11 extends through the inner cylinder 9a and cooperates with a nut 12 to secure the inner cylinder 9a in place within the bracket 2. The sleeve 5 is fitted about the outer cylinder 9c.

Figure 3:
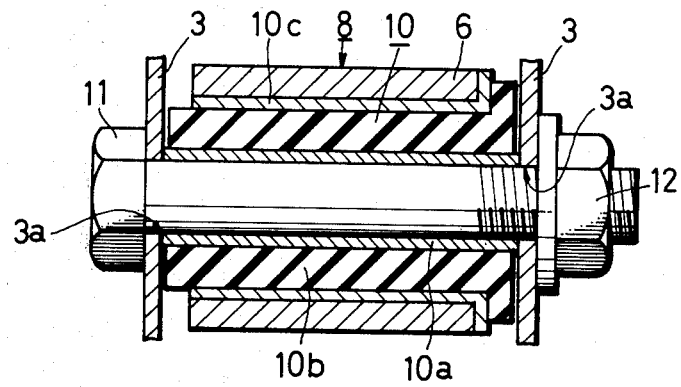
FIG. 3 is an enlarged sectional view taken on the line III—III of FIG. 1.

The bush 10 in the inner connecting portion 8 is similarly constructed as shown in FIG. 3. Such includes a metallic inner cylinder 10a, a metallic outer cylinder 10c, and a cylindrical vibration damping member 10b made of elastic material, such as rubber, and interposed between the inner and outer cylinders 10a and 10c. The bracket 3 has a pair of holes 3a through which a bolt 11 extends. The bolt 11 extends through the inner cylinder 10a and cooperates with a nut 12 to secure the inner cylinder 10a within the bracket 3. The sleeve 6 is fitted about the outer cylinder 10c. and suspension arm 4 is provided at its end remote from the suspension member 1 with a spindle 4a on which a wheel 13 is mounted.

Figure 4:
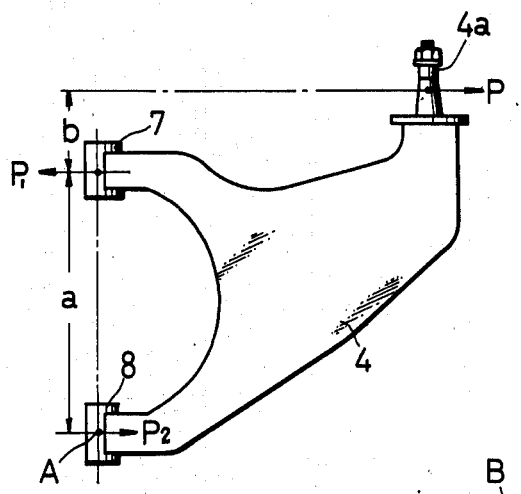
FIGS. 4 to 6 are top plan views diagrammatically illustrating the modes in which load acts on the suspension in different directions.
Figure 5:
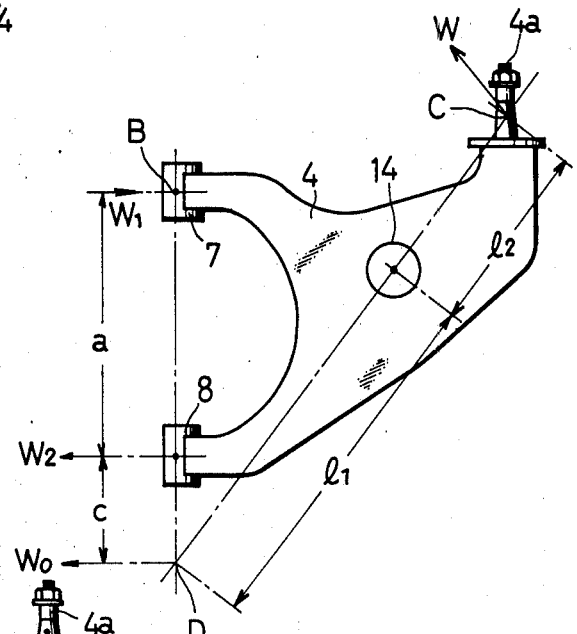
Figure 6:
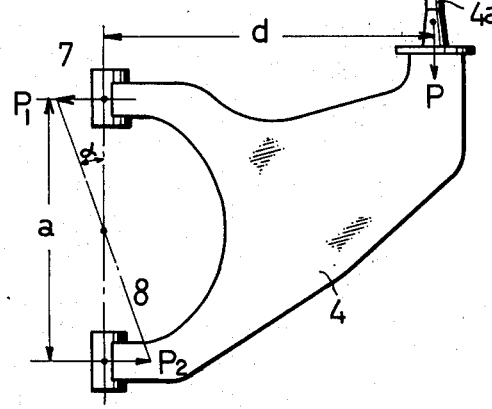

Attention is now directed to FIGS. 4 through 6 for a study of a number of kinds of load acting in different directions on the connecting portions 7 and 8 of the arm 4 with the suspension member 1. Firstly, FIG. 4 illustrates a situation involving the load acting longitudinally on the vehicle. When under this situation the force acting on the spindle 4a is expressed as P, and the reaction forces consequently acting on the outer and inner connecting portions 7 and 8 as $P_1$ and $P_2$, respectively. In view of the balance of the force acting on the arm 4 and the moment prevailing at the point A, $$P_1 - P_2 = P \qquad (1)$$

$$P_1 a = P(a+b) \qquad (2)$$

$$P_1 = (a+b/a)P \qquad (3)$$

Accordingly, the following formula is obtained:

$$P_2 = +(b/a)P \qquad (4)$$

The formulas 1 through 4 indicate that $P_1$ is greater than $P_2$. In other words, a greater force acts on the outer connecting portion 7 than on the inner connecting portion 8 in case of the load acting longitudinally on the vehicle.

FIG. 5 illustrates a situation involving the load acting vertically on the vehicle. An external force acting upwardly on a point C on the spindle 4a is designated as W, while the intersection of the line connecting the point C with the point of action of the coil spring 14 and the line connecting the points of action of forces on the connecting portions 7 and 8 is indicated as D and the force acting on the intersection D is indicated as $W_0$. Then the following formula is obtained:

$$W_0 = W(l_2/l_1)$$

By substituting the relationship between the forces $W_1$ and $W_2$ acting on the connecting portions 7 and 8 for the above formula, the force acting about the point B of action of the force $W_1$ on the outer connecting portion 7 is formularized:

$$W_2 a = W_0(a+c)$$

Hence, $$W_2 = \frac{a+c}{a} W_0 \quad (I)$$

As $W_1 = W_0 - W_2$, the following formula is obtained by substitution:

$$W_1 = -(c/a)W_0 \quad (II)$$

The formulas I and II indicate that $W_2$ is greater than $W_1$. In other words, a greater force acts on the inner connecting portion 8 than on the outer connecting portion 7 in the situation where the load working vertically on the vehicle is involved.

FIG. 6 illustrates a situation involving the load working sideways or transversely on the vehicle. When the force acting on the spindle 4a is expressed as P and the forces consequently acting on the arm 4 at the connecting portions 7 and 8 as $P_1$ and $P_2$, respectively, the following formulas are obtained in view of the balance of the forces and the moment acting on the arm 4:

$$P_1 = P_2$$

$$P_1 = (d/a)P$$

The formulas indicate that an equal amount of force acts on both the outer and inner connecting portions 7 and 8 when the vehicle is subjected to a transversely working load.

Returning to FIGS. 1 through 3, it will be observed that the bush 9 on the outer connecting portion 7 is greater in outside diameter than the bush 10 on the inner connecting portion 8, and has a greater wall thickness. It will, therefore, be understood that the outer bush 9 has a smaller spring rate in view of its greater mechanical strength.

The suspension arm construction according to this invention thus provides better compliance with the greater force acting on the outer bush 9 when the vehicle is subjected to a longitudinally working load, so that the vehicle is more comfortable to ride in. When the load acting vertically on the vehicle is a problem, the inner bush 10 having a larger spring rate functions to minimize variations in the camber of the wheels, though a greater force acts on the inner bush 10.

Referring again to FIG. 6, the values of deflection $\delta_1$ and $\delta_2$ of the outer and inner bushes 9 and 10, respectively, upon application of the forces $P_1$ and $P_2$ thereto are obtained by the following formulas:

$$\delta_1 = P_1/k_1$$

$$\delta_2 = P_2/k_2$$

wherein $k_1$ represents the spring rate of the bush 9, and $k_2$ represents the spring rate of the bush 10. The steering angle $\alpha$ is, therefore, represented by the following formula:

$$\tan \alpha = (\delta_1 + \delta_2)/a$$

Thus, it is possible to control the steering angle $\alpha$ within a small range by changing the spring rates of the bushes 9 and 10.

Although the invention has been described with reference to a preferred embodiment thereof, it is to be understood that modifications or variations may be readily made by those skilled in the art without departing from the spirit and scope of this invention as defined in the appended claims.

What is claimed is:

1. A trailing arm suspension comprising:
   a suspension arm having an inner connecting portion and an outer connecting portion; and
   a suspension member to which said suspension arm is connected at said inner and outer connecting portions;
   each of said connecting portions comprising a sleeve and a horizontally oriented bush received in said sleeve, each said bush comprising an inner cylinder, an outer cylinder and a cylindrical vibration damping member interposed between said inner and outer cylinders, said inner cylinder being connected to said suspension member by a bolt, said outer cylinder being retained by said sleeve;
   said vibration damping member of said bush in said outer connecting portion being designed to cause a smaller deflection than said vibration damping member of said bush in said inner connecting portion when an equal amount of load is radially applied to said vibration damping members.

2. A trailing arm suspension as defined in claim 1, wherein said vibration damping members in said inner and outer connecting portions are both made of the same material; and said vibration damping member in said outer connecting portion has a greater wall thickness than said vibration damping member in said inner connecting portion.

3. A trailing arm suspension as defined in claim 1, wherein said vibration damping members in said inner and outer connecting portions are equally dimensioned; and
   said vibration damping member in said outer connecting portion has a smaller spring rate than said vibration damping member in said inner connecting portion.

4. A trailing arm suspension as defined in claim 1, wherein said vibration damping member in said outer connecting portion is made of a material having a smaller spring rate than the material of which said vibration damping member in said inner connecting portion is made; and
   wherein said vibration damping member in said outer connecting portion has a greater wall thickness than said vibration damping member in said inner connecting portion.

5. A trailing arm suspension comprising:
   a suspension arm having an inner connecting portion and an outer connecting portion; and
   a suspension member to which said suspension arm is connected at said inner and outer connecting portions;
   each of said connecting portions comprising a sleeve and a bush received in said sleeve, each said bush comprising an inner cylinder, an outer cylinder and a cylindrical vibration damping member interposed between said inner and outer cylinders, said inner cylinder being connected to said suspension member by a bolt, said outer cylinder being retained by said sleeve;
   said vibration damping member of said bush in said outer connecting portion being designed to cause a smaller deflection than said vibration damping member of said bush in said inner connecting portion when an equal amount of load is radially applied to said vibration damping members wherein said vibration damping members in said inner and outer connecting portions are equally dimensioned; and said vibration damping member in said outer connecting portion has a smaller spring rate than said vibration damping member in said inner connecting portion.

6. A trailing arm suspension comprising:

a suspension arm having an inner connecting portion and an outer connecting portion; and a suspension member to which said suspension arm is connected at said inner and outer connecting portions;

each of said connecting portions comprising a sleeve and a bush received in said sleeve, each said bush comprising an inner cylinder, an outer cylinder and a cylindrical vibration damping member interposed between said inner and outer cylinders, said inner cylinder being connected to said suspension member by a bolt, said outer cylinder being retained by said sleeve;

said vibration damping member of said bush in said outer connecting portion being designed to cause a smaller deflection than said vibration damping member of said bush in said inner connecting portion when an equal amount of load is radially applied to said vibration damping members wherein said vibration damping member in said outer connecting portion is made of a material having a smaller spring rate than the material of which said vibration damping member in said inner connecting portion is made; and wherein said vibration damping member in said outer connecting portion has a greater wall thickness than said vibration damping member in said inner connecting portion.

* * * * *